United States Patent
Duval (10) Patent No.: US 11,134,295 B2
(45) Date of Patent: Sep. 28, 2021

(54) EXTERNAL MODULE COMPRISING PROCESSING FUNCTIONALITY

(71) Applicant: NAGRASTAR LLC, Englewood, CO (US)

(72) Inventor: Gregory Duval, Englewood, CO (US)

(73) Assignee: NAGRASTAR LLC, Englewood, CO (US)

( * ) Notice: Subject to any disclaimer, the term of this patent is extended or adjusted under 35 U.S.C. 154(b) by 0 days.

(21) Appl. No.: 15/843,219

(22) Filed: Dec. 15, 2017

(65) Prior Publication Data

US 2019/0132633 A1     May 2, 2019

Related U.S. Application Data (60) Provisional application No. 62/578,097, filed on Oct. 27, 2017.

(51) Int. Cl.
*H04N 21/418*     (2011.01)
*H04N 21/4363*     (2011.01)
(Continued)

(52) U.S. Cl.
CPC ... *H04N 21/4183* (2013.01); *H04N 21/42206* (2013.01); *H04N 21/43615* (2013.01); *H04N 21/43635* (2013.01); *H04N 21/4402* (2013.01)

(58) Field of Classification Search
CPC ....... H04N 21/43637; H04N 21/43615; H04N 21/43635; H04N 21/440218;
(Continued)

(56) References Cited

U.S. PATENT DOCUMENTS 7,245,906 B2    7/2007    Hirata
7,895,442 B1 *   2/2011    Adams .................... G06F 21/10
                                                                     380/201
(Continued)

FOREIGN PATENT DOCUMENTS

DE     202012104991 U1    1/2013
EP          2648417 A1    10/2013
(Continued)

OTHER PUBLICATIONS

PCT International Search Report and Written Opinion in PCT/US2018/047734, dated Dec. 6, 2018, 14 pages.
(Continued)

*Primary Examiner* — Mulugeta Mengesha
*Assistant Examiner* — Alazar Tilahun (57) ABSTRACT

Examples of the present disclosure describe systems and methods for implementing an external module comprising new and/or offloaded processing functionality. In aspects, an external module may be configured to be selectively and communicatively coupled to an information appliance device. The external module may be configured with or receive hardware, software, data and/or instructions for processing content and operations received by the information appliance device. When operations are received by the information appliance device, the information appliance device may parse the operations into commands to be performed by the information appliance device and commands to be performed by the external module. The information appliance device may transmit the commands to be performed by the external module to the external module. The external module may then process and/or perform the received commands and render the resulting content to a display device.

20 Claims, 6 Drawing Sheets

(51) Int. Cl.
*H04N 21/436* (2011.01)
*H04N 21/422* (2011.01)
*H04N 21/4402* (2011.01)

(58) Field of Classification Search
CPC ............ H04N 21/431; H04N 21/4104; H04N 5/4403; H04N 21/8146; H04N 21/4622; H04N 5/44582; H04N 21/4782; H04N 21/485; H04N 21/00; H04N 21/2541; H04N 21/422; H04N 21/4363; H04N 21/4367; H04N 21/4402; H04N 21/4627; H04N 21/4183; H04N 21/42206; G06T 15/20; G06T 2200/24; G06T 2215/16; G06F 3/0482; G06F 3/04815; G06F 2203/04802; G06F 3/04842; G06F 9/445; G11B 27/34
USPC ........................................................ 725/80–85
See application file for complete search history.

(56) References Cited

U.S. PATENT DOCUMENTS

| | | | |
|---|---|---|---|
| 8,120,707 B2 | 2/2012 | Raines | |
| 8,650,600 B2* | 2/2014 | Ogle | H04W 4/21 725/81 |
| 8,943,409 B2 | 1/2015 | Bryant-Rich et al. | |
| 9,098,163 B2* | 8/2015 | Kuo | H04N 5/4403 |
| 9,326,020 B2 | 4/2016 | Ogle et al. | |
| 2009/0141894 A1* | 6/2009 | Sahdra | H04N 21/4104 380/239 |
| 2010/0183149 A1* | 7/2010 | Candelore | G06F 21/6218 380/210 |
| 2011/0150436 A1* | 6/2011 | Hesselink | G11B 27/10 386/343 |
| 2012/0246568 A1 | 9/2012 | Gentil | |
| 2012/0254931 A1* | 10/2012 | Oztaskent | H04N 21/4126 725/112 |
| 2013/0242117 A1* | 9/2013 | Luo | H04N 21/43615 348/181 |
| 2016/0112670 A1 | 4/2016 | Majid | |
| 2016/0378704 A1* | 12/2016 | Adamson | G06F 13/364 710/104 |
| 2017/0223404 A1 | 8/2017 | Zhang et al. | |
| 2017/0332149 A1* | 11/2017 | Veeramani | H04N 21/25825 |

FOREIGN PATENT DOCUMENTS

| | | |
|---|---|---|
| EP | 3169076 | 5/2017 |
| GB | 2547442 A | 8/2017 |
| WO | 2015145470 | 10/2015 |

OTHER PUBLICATIONS

European Extended Search Report in 18150428.3, dated Jul. 23, 2018, 8 pages.
International Preliminary Report on Patentability dated Apr. 28, 2020 for Application No. PCT/US2018/047734, 6 pages.
European Patent Application No. 18150428.3, Examination Report dated Jul. 9, 2021, 6 pages.

\* cited by examiner

EXTERNAL MODULE COMPRISING PROCESSING FUNCTIONALITY

CROSS-REFERENCE TO RELATED APPLICATIONS

This application claims priority to U.S. provisional application Ser. No. 62/578,097, filed Oct. 27, 2017, entitled "EXTERNAL MODULE COMPRISING PROCESSING FUNCTIONALITY," which application is incorporated herein by reference in its entirety.

BACKGROUND

Various information appliances are operable to receive an external signal, convert the external signal into content, and cause the content to be displayed on one or more display devices. Generally, information appliance devices implement hardware and/or software configurations that cannot be efficaciously modified, upgraded or maintained. As a result, such information appliance devices will often simply be replaced. Such replacements are not cost effective for information appliance devices suppliers and users, and substantially degrade the user experience of information appliance device users.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods for implementing an external module comprising new and/or offloaded processing functionality. In aspects, an external module may be configured to be selectively and communicatively coupled to an information appliance device. The external module may be configured with or receive hardware, software, data and/or instructions for processing content and operations received by the information appliance device. When operations are received by the information appliance device, the information appliance device may parse the operations into commands to be performed by the information appliance device and commands to be performed by the external module. The information appliance device may transmit the commands to be performed by the external module to the external module. The external module may then process and/or perform the received commands and render the resulting content to a display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure describes systems and methods for implementing an external module comprising new and/or offloaded processing functionality. In aspects, an external module, such as a dongle or similar peripheral device, may be configured to be communicatively coupled to one or more information appliance devices, such as a mobile phones, smart devices, personal digital assistants (PDAs), satellite or cable set-top-boxes (STBs), desktop computers, laptop computers, tablet computers, televisions, radios, or any other display device(s) known to the art. The external module and/or the information appliance device(s) may be connected via one or more connections, such as a USB connection, a Firewire connection, a Thunderbolt connection, an HDMI connection or similar digital audio/visual connection, etc. In at least one example, the external module may comprise multiple outputs, such that the external module and multiple information appliance devices may be simultaneously connected in series or parallel. One or more means of encryption or other data security techniques may be used to transmit communicates between the external module and one or more coupled devices. The external module may comprise hardware (e.g., one or more processors, memory, data storage, etc.), software (e.g., device drivers, audio/ video codecs, functionality instruction sets, I/O modules, etc.), and information (e.g., video data streams, audio data streams, content metadata, etc.) for processing content and operations generated/received by the information appliance device, or received directly by the external module. In examples, such hardware/software may be made used in conjunction with (or in lieu of) the hardware/software of one or more coupled appliance devices. For instance, an information appliance device may leverage the processing and memory resources of an external module to improve the quality of received content or to improve the performance of the information appliance device. Content, as used herein, may refer to one or more data transmissions broadcasted or otherwise accessible from a content provider, content store, or computing device. In examples, the operations received by the information appliance device (or the external module) may originate from an external or internal input means, such as a remote control, a keyboard, a microphone, or the like.

In aspects, the external module may provide functionality that is absent from an information appliance device, or that improves the functionality of an information appliance device. For example, the external module may be configured to process (or facilitate the processing of) new/additional video resolutions (e.g., 1080p, 4K, 8K, etc.), implement new/additional video and/or audio codecs (e.g., HEVC/ H.265, VP9, etc.), implement new/additional A/V connection standards, (e.g., HDMI 2.0, HDCP 2.2, etc.), implement wireless technologies (e.g., Wi-Fi, Bluetooth, etc.), and the like. As another example, the external module may be configured to store and provide access to content received by, or otherwise accessible to, the external device. In some aspects, the functionality provided by the external module may obviate the replacement or upgrade of the information appliance device or associated peripheral devices. For example, an external device for processing emerging technology may be attached to an appliance device that cannot be (efficaciously) configured to incorporate such technology. As another example, the external module may be configured to be controlled using the existing remote control (or other input device) of the information appliance device. Alternately, the external module may be configured to be controlled using an input mechanism that comes with the external module. In at least one example, the input mechanism that comes with the external module may be used to control one or more devices connected to the external module.

In some aspects, the software and/or information comprised by the external module may be transmitted to the external module by the information appliance device according to one or more criteria. As one example, the information appliance device may automatically upload or port one or more code sections, APIs, and/or services to the external module upon a first coupling or in response to a setup/configuration operation. As another example, the information appliance device may upload or port such information in response to a user request (e.g. on demand) or in response to a user initiated event. In such examples, the upload process may include removing or otherwise disabling the same or equivalent uploaded functionality on the information appliance device. The computing resources freed from the removal/disabling of the equivalent uploaded functionality may then be reallocated by the information appliance device. In other aspects, the hardware and information may be preinstalled on the external module. For example, the external module may be preconfigured with data (e.g., code sections, APIs, and/or services) and/or components (e.g., RAM, flash, GPUs, drivers, etc.) to process content and operations received by the information appliance device. In such an example, the preconfigured data/components may enable the external module to provide new and/or additional functionality to the information appliance device.

In aspects, when one or more operations are received by the information appliance device, the information appliance device may parse the operations into commands to be performed by the information appliance device and commands to be performed by the external module. The information appliance device may perform the commands to be performed by the information appliance device and transmit the commands to be performed by the external module to the external module. The external module may then process and/or perform the received commands. In some examples, processing the received commands may include transmitting data and/or one or more requests to the information appliance device. In other examples, the external module may engage in no appreciable communication with the information appliance device as a result of processing the received commands. After performing the received commands (or performing operations associated with the received commands), the external module may render (or cause to be rendered) content to the display device. In examples, rendering the content may include generating new content, overlaying new content on a base video stream, modifying a base video stream, or the like.

Accordingly, the present disclosure provides a plurality of technical benefits including but not limited to: using an external module to provide new or additional processing functionality to an appliance device, offloading information appliance device functionality to an external module; enhancing the technical capabilities of a content consuming system; dynamically freeing and reallocating computing resources on an information appliance device; offloading functionality using a plug-and-play mechanism; external processing via remote procedure calls (RPC); enhancing information appliance remote control functionality by enabling remote control interaction with an external processing module; reducing the computational burden on information appliance devices; and improving efficiency and quality for applications/services utilizing examples of the present disclosure, among other examples.

Figure 1:
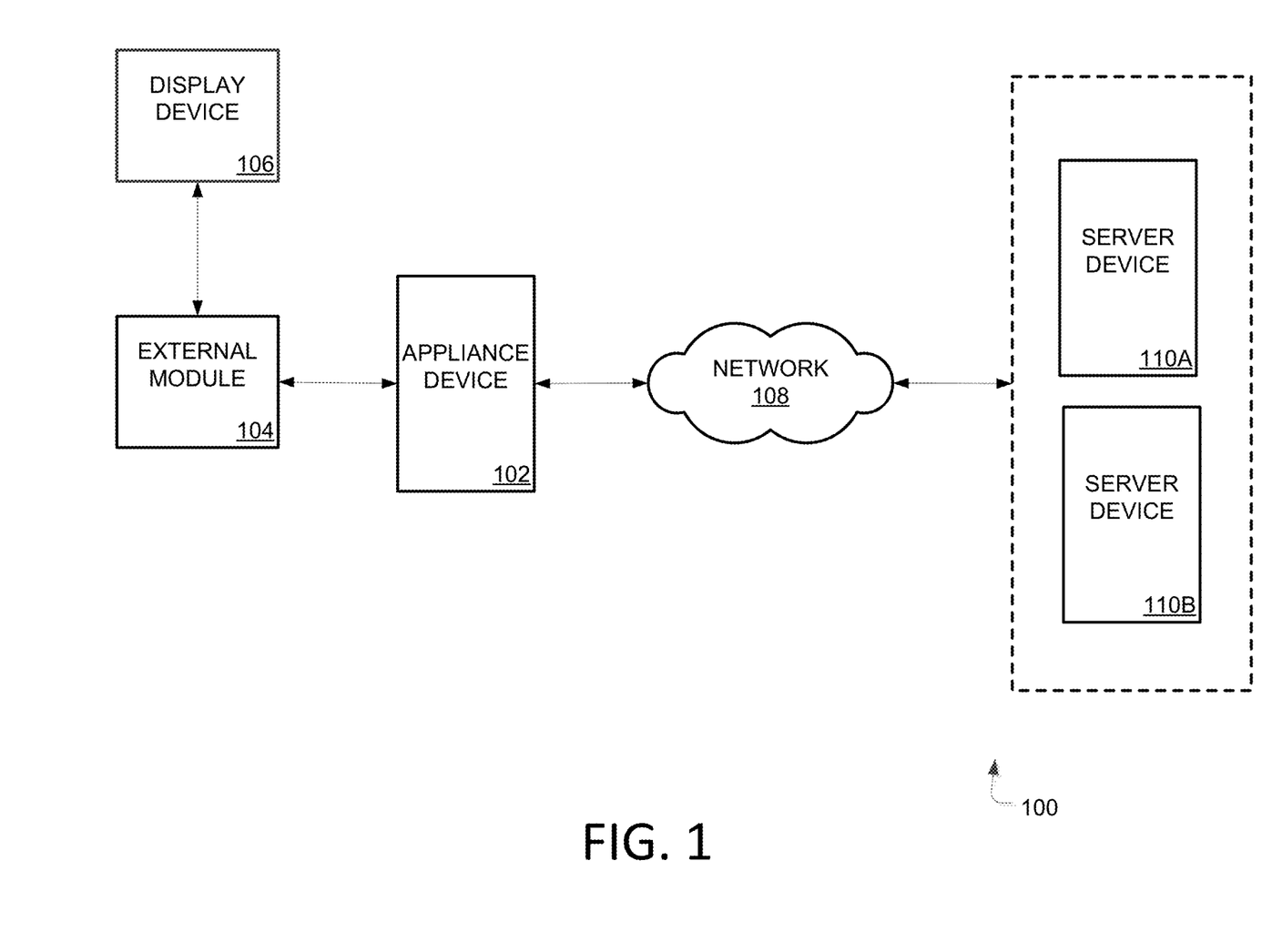
FIG. 1 illustrates an overview of an exemplary system for implementing an external module comprising new and/or offloaded processing functionality as described herein.

FIG. 1 illustrates an overview of an example system for implementing an external module comprising new and/or offloaded processing functionality as described herein. Exemplary system 100 as presented is a combination of interdependent components that interact to form an integrated whole for implementing new and/or offloaded processing functionality using an external module. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an exemplary system 100 may provide an environment for software components to run, obey constraints set for operating, and utilize resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic devices. As an example of a processing device operating environment, refer to the exemplary operating environments depicted in FIG. 4. In other examples, the components of systems disclosed herein may be spread across multiple devices. For instance, input may be entered on a client device and information may be processed or accessed from other devices in a network, such as one or more server devices.

As one example, the system 100 comprises appliance device 102, external module 104, display device 106, network 108, and a network device environment comprising server devices 110A and 110B. One of skill in the art will appreciate that the scale of systems such as system 100 may vary and may include more or fewer components than those described in FIG. 1. In some examples, interfacing between components of the system 100 may occur locally, for example, where components of system 100 are within the same device or network (e.g., peer to peer network, LAN, etc.). In other examples, interfacing between components of the system 100 may occur remotely, for example, where components of system 100 may be spread across one or more devices of a distributed network.

Appliance device 102 may be configured to receive and process content from one or more content providers. In aspects, appliance device 102 may comprise hardware, software, data and/or instructions for processing received content, interfacing with external (or internal) devices, and performing events and operation requests. Content, as used herein, my refer to one or more data transmission streams broadcasted or otherwise transmitted from a content provider or content store. For example, appliance device 102 may be configured to interface with server devices 110A and 110B via network 108. Server devices 110A and 110B may be content providers configured to provide content to appliance device 102. Examples of content providers may include a cable or satellite head-end, a web server, a document repository, a client device, a terrestrial broadcast station, a wireless transmission device, etc. In at least one aspect, processing the content received by appliance device 102 may include uncompressing the content, demodulating the content, descrambling the demodulated content, decoding the descrambled content and/or adding features or additional content to the received content.

Appliance device 102 may be further configured to offload processing functionality to one or more external modules or devices. In aspects, appliance device 102 may comprise a set of instructions for facilitating the upload (e.g., offload) of information to an external module, such as external module 104. The set of instructions may comprise commands for transmitting information to/from the external module, and commands for establishing means to detect events, actions and operations of interest. Such information may include applications, services, one or more code sections, APIs, event handler data/objects, etc. In examples, the set of uploading instructions may be automatically invoked upon the satisfaction one or more criteria, according to a periodic schedule, in response to a user request, or the like. In at least one example, after the information of appliance device 102 has been uploaded to the external module, appliance device 102 may remove or otherwise disable the local version of the uploaded information. Appliance device 102 may then free and/or reallocate the computing resources (e.g., CPU, memory, etc.) previously allocated to the removed/disabled information.

External module 104 may be configured to perform various types of processing functionality. In aspects, external module 104 may comprise hardware and/or software for performing various processing tasks and actions. Such tasks and actions may relate to adding new processing functionality to appliance device 102, modifying existing processing functionality of appliance device 102, or processing functionality offloaded by appliance device 102. In examples, external module 104 may be operable to be selectively coupled to multiple devices. For instance, external module 104 be coupled (individually or simultaneously) to appliance device 102, display device 106 and/or additional devices via one or more connections (e.g., USB connection, HDMI connection, etc.). External module 104 may be operable to perform companion operations for one or more devices connected to (or having access to) external module 104. For example, when coupled to external module 104, appliance device 102 may offload or transmit information (e.g., code sections, APIs, services, etc.) or one or more processing utilities to external module 104. Alternately, the at least a portion of the information or processing utilities may be preinstalled on external module 104.

In aspects, the information and/or processing utilities received by (or preinstalled on) external module 104 may enable external module 104 to provide new or additional capabilities and/or processing functionality to appliance device 102. For example, external module 104 may comprise or enable new functionality to support technological advances to hardware, software, content and/or content delivery techniques. For instance, external module 104 may enable the processing of an encoding/decoding scheme that is new or currently unsupported by appliance device 102, such as HEVC. Alternately, external module 104 may enable the processing of an A/V connection standard currently unsupported by appliance device 102, such as HDMI 2.0 or HDCP 2.2. Although specific decoding schemes and A/V connection standard are recited herein, one of skill in the art will appreciate that various alternatives may be used. As another example, external module 104 may extend the capabilities of appliance device 102. For instance, external module 104 may provide appliance device 102 access to additional computational resources, memory resources, storage space, Wi-Fi services, output ports, audio and/or video codecs, etc. In examples, the additional resources provided to appliance device 102 by external module 104 may be accessible locally on external module 104 or remotely via external module 104.

In alternate aspects, the information and/or processing utilities on external module 104 may enable external module 104 to provide processing functionality previously performed (in full or in part) by appliance device 102. As an example, external module 104 may comprise user interface (UI) code offloaded from, or substantially duplicated on) appliance device 102. The UI code may comprise the framework and functions for processing and/or rendering a data stream, such as a base video stream, on a display device. When external module 104 is connected to appliance device 102, the external module 104 may implement a process for detecting or intercepting UI-based events transmitted to (or generated by) appliance device 102. External module 104 may process the UI-based events using at least a portion of the UI code of external module 104. Processing the UI-based events may include, for example, decompressing received content and outputting the decompressed content to an HDMI port, watermarking received content, transscrambling received content, transcoding received content, etc. After processing the UI-based events, external module 104 may transmit the processed content to one or more attached devices. For example, external module 104 may output decoded content to display device 106, thereby relieving appliance device 102 of the resource burden associated with UI processing. As another example, external module 104 may output processed content to multiple devices connected in parallel, such as display device 106, a mobile phone, a virtual reality headset, a wearable device, and/or the like.

In aspects, external module 104 may be seamlessly implemented as a companion to one or more connected devices. For example, external module 104 may be implemented in a system comprising appliance device 102 and display device 106. Implementation of external module 104 may be a fairly simple "plug and play" process or a similarly straightforward connection process. For instance, the external module 104 may be fully implemented and configured by simply connecting one or more connectors of external module 104 to appliance device 102 and display device 106. The simplicity of the implementation process may obviate the need for an external module supplier to provide technical assistance (e.g., a truck roll, a service call, etc.) during the implementation process. In such examples, external module 104 may be appliance device type-independent and/or display device type-independent. As a result, the devices connected to external module 104 may be upgraded or replaced without needing to replace external module 104. As another example, external module 104 may be implemented without requiring the use or installation of additional hardware or peripheral devices. For instance, external module 104 may be configured to be operated, or interacted with, using a preexisting control system (e.g., an appliance device remote control, a display device remote control, a universal remote control, etc.). Alternately, external module 104 may be configured, or interacted with, using a control system that comes with external module. In at least one example, such a control system be used interchangeably with (or in place of) a control system of the appliance device 102. Additionally, external module 104 may be compatible with previously acquired content and events stored on appliance device 102 and/or display device 106. For instance, implementing external module 104 may enable users to keep their DVR content, events and timers. In aspects, external module 104 may be powered using an external power supply or by one or more coupled devices.

Appliance device 102 may be further configured to process received operation requests. In aspects, upon detecting an operational event (such as receiving remote control input, a timer firing, receiving specified content, etc.), appliance device 102 may parse the detected event to identify one or more events and/or event types. Appliance device 102 may then evaluate the events/event types to determine whether the events/event types are to be processed by the appliance device 102 or external module 104. In at least one example, the evaluation of events/event types may include identifying a set of external function calls, and determining whether the events/event types may be processed using the external function calls. For instance, UI code corresponding to functionality previously performed by appliance device 102 may be offloaded by appliance device 102 to external module 104. Alternately, UI code representing new or modified functionality to appliance device 102 may be preinstalled on external module 104. In either scenario, a set of external function calls for accessing the UI code on the external module 104 may be accessible (or made accessible) on appliance device 102. When a set of events are received and/or processed by appliance device 102, appliance device 102 may parse the events into UI-based events and non-UI-based events. Appliance device 102 may process the non-UI-based events locally and transmit the UI-based events to external module 104. External module 104 may then process the UI-based events as described above.

Figure 2:
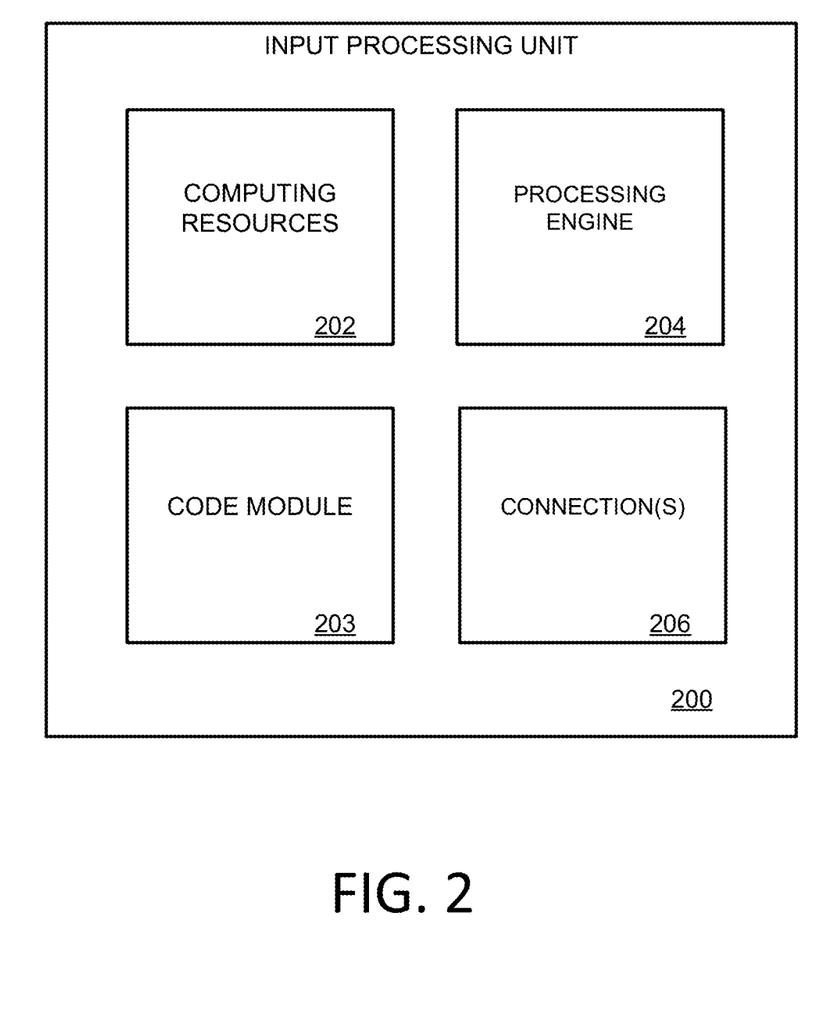
FIG. 2 illustrates an exemplary input processing unit comprising new and/or offloaded processing functionality as described herein.

FIG. 2 illustrates an overview of an exemplary input processing unit 200 for implementing an external module comprising new and/or offloaded processing functionality, as described herein. The processing functionality techniques implemented by input processing unit 200 may comprise the processing functionality techniques, content and input described in FIG. 1. In alternative examples, a distributed system (comprising one or more components such as processor and/or memory) may perform processing described in system 200. Further, input processing unit 200 may comprise a display component as described in the description of FIG. 1.

With respect to FIG. 2, input processing unit 200 may comprise computing resources 202, code module 203, processing engine 204, and connection(s) 206. Computing resources 202 may comprise hardware, software, data and/or instructions for accomplishing various tasks. For example, computing resources 202 may comprise one or more processors (e.g., CPUs, GPUs, etc.), memory (e.g., flash memory, DRAM, SRAM, etc.), device drivers, wireless adapters, data storage units, etc. Computing resources 202 may be implemented such that computing resources 202 are accessible and/or useable by connected devices. For instance an appliance device, such as an STB, that is connected to the input processing unit 200 may be able to leverage the one or more processors of input processing unit 200 to process received content. In examples, computing resources 202 may be configured with (or configured to receive) a computing code base or a code module, such as code module 203.

Code module 203 may comprise code segments, codecs, content, events and/or operations for performing (or causing to be performed) various functionality related to one or more attached (or attachable) devices. For example, code module 203 may be configured with user interface (UI) code for processing UI-based commands received (or generated by) one or more devices, such as appliance device 102 or display device 106. As another example, code module 203 may be configured with one or more encoding/decoding codecs. As yet another example, code module 203 may be configured to enable the wireless transmission of data and content using a wireless adapter of computing resources 202. In some aspects, code module 203 (or portions thereof) may be preinstalled on input processing unit 200. For instance, code module 203 may be installed on input processing unit 200 by a supplier of input processing unit 200 or a supplier of a device attachable to input processing unit 200. In other aspects, input processing unit 200 may receive code module 203 (or portions thereof) from an attached device, such as appliance device 102, via one or more communication connection, such as connection(s) 206. Connection(s) 206 may be any suitable communication connection for transmitting data between devices described herein (e.g., a USB connection, a mini-USB connection, an HDMI connection, a DVI connection, etc.). For instance, connections 206 may enable input processing unit 200 to be simultaneously connected to one or more appliance devices and/or one or more display devices.

In aspects, the transmission (offload) of code module 203 to input processing unit 200 may be triggered in response to the satisfaction of one or more criteria. For instance, code module 203 may be automatically transmitted to input processing unit 200 in response to detecting a connection between input processing unit 200 and an appliance device. Alternatively, code module 203 may be transmitted to input processing unit 200 in response to a manual request or a specific user interaction. Continuing with the specific example above, input processing unit 200 may be configured to receive and implement a transmitted (offloaded) code module comprising UI code. In such an example, transmitting the UI code from the appliance device may enable the appliance device to remove or disable UI functionality associated with the UI code. As a result, the appliance device may be able to reclaim and reallocate the computing resources previously allocated to the UI functionality.

Processing engine 204 may be configured to process events and perform functionality related to code module 203. In aspects, processing engine 204 may utilize computing resources 202 to process data (e.g., content, events, and/or operations) relating to new processing functionality (e.g., not previously implemented by the appliance device) and/or functionality offloaded to input processing unit 200 from an appliance device. In examples, such data may be received and processed directly by input processing unit 200. Processing the received data may include identifying events that relate to (or are serviceable using) the processing functionality. For instance, processing engine 204 may receive or have access to one or more UI-based events. Processing engine 204 may evaluate the UI-based events to determine whether the UI-based events invoke or are related to any actions/tasks. Alternately, the data may be received by the appliance device. The appliance device may parse the data to identify events relating to the processing functionality of input processing unit 200, and events unrelated to the processing functionality. The appliance device may then locally process the events unrelated to the processing functionality of input processing unit 200, and transmit the events relating to the processing functionality of input processing unit 200 to input processing unit 200.

Processing engine 204 may further be configured to perform one or more actions/tasks related to the one or more processed events. For instance, continuing with the specific example above, the UI-based events received/accessible by processing functionality engine 204 may originate from an external or internal input modality, such as a remote control, a keyboard, a microphone, etc. In response to the receiving/identifying the UI-based events, the processing engine 204 may, for example, overlay one or more UI elements (e.g., menus, windows, cursors, etc.) onto a base video stream made accessible to the input processing unit 200 via an attached device. As another example, in response to the receiving/identifying the UI-based events, the processing engine 204 may perform a decoding process using a decoding codec implemented by code module 203. For instance, processing engine 204 may use an HEVC codec of code module 203 to decode 4K content on a base video stream. In aspects, processing engine 204 may transmit content related to events processed using code module 203 to a display device or component using connection(s) 206. In examples, the display device or component may be external to input processing unit 200, such as display device 106, or internal to input processing unit 200.

Figure 3:
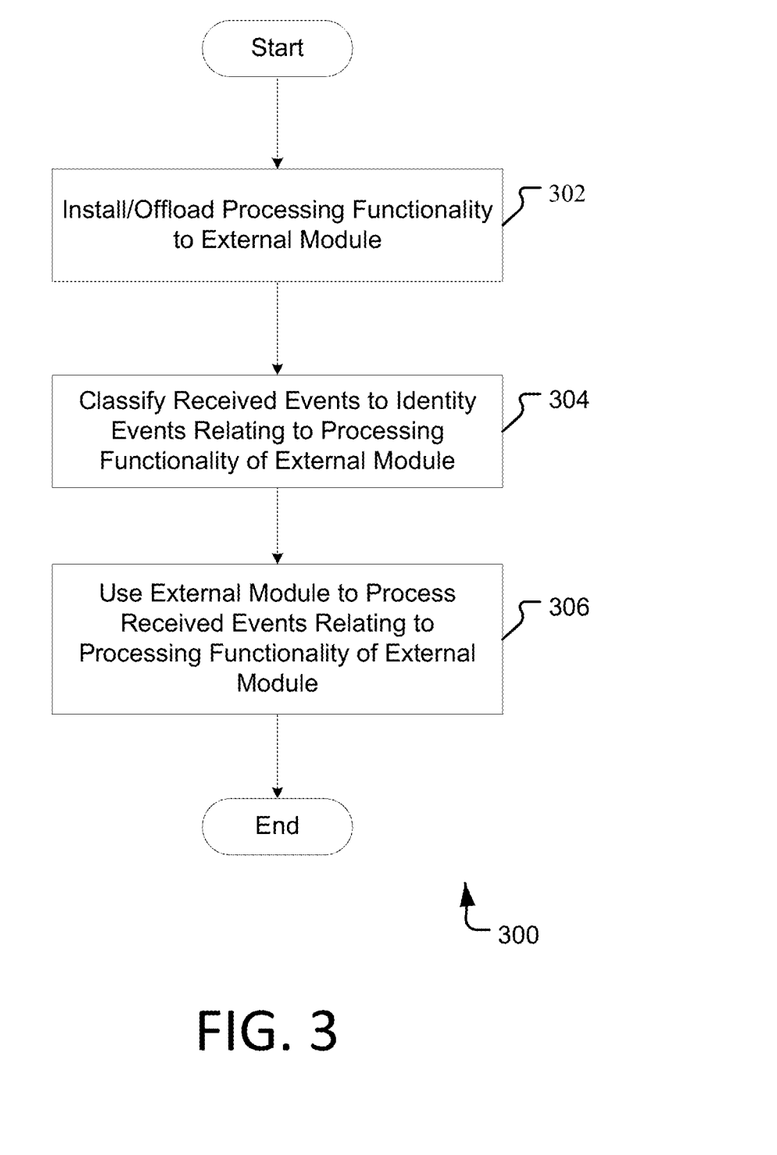
FIG. 3 illustrates an example method of performing new and/or offloaded processing functionality using an external module as described herein.

FIG. 3 illustrates an example method of performing new and/or offloaded processing functionality using an external module, as described herein. In aspects, methods 300-500 may be executed by an exemplary system such as system 100 of FIG. 1. In examples, methods 300-500 may be executed on a device comprising at least one processor configured to store and execute operations, programs or instructions. However, methods 300-500 is not limited to such examples. In other examples, methods 300-500 may be performed by an application or service for implementing new and/or offloaded processing functionality using an external module. In at least one example, methods 300-500 may be executed (e.g., computer-implemented operations) by one or more components of a distributed network, such as a web service/distributed network service (e.g. cloud service).

Exemplary method 300 begins at operation 302 where processing functionality may be installed on or offloaded to an external module. In aspects, various processing functionality of one or more devices, such as appliance device 102, may be installed on or offloaded to an external module, such as external module 104. For instance, a transportable dongle device may comprise processing hardware and/or software for executing at least a portion of the functionality and features of one or more set-top boxes (STBs) and/or one or more display devices. The dongle device may comprise, for example, user interface (UI) code facilitating the use one or more audio and/or video encoding/decoding utilities, audio/video connection standards, wireless communications, and the like. In examples, such installation and/or offloading may be utilized for several reasons. As one example, the installation/offloading of processing functionality may be used to mitigate or offset the computing resource impact on resource-constrained devices. For instance, over time, STBs may run out of processing resources, memory and/or storage. Such STBs may utilize the computing hardware and resources of the dongle device described herein to offset the computational load on the STBs. Alternately, the STBs may offload a set of processing tasks to the dongle device. As another example, the installation/offloading of processing functionality may be used to provide functionality unavailable to the appliance device, or impractical to implement on the appliance device (due to, for example, cost, technical feasibility, deployability, etc.). For instance, an STB may be capable of demodulating, descrambling and/or decoding non-4K content. As it may not be cost-effective or practical to replace or upgrade the STB to process 4K content, a dongle device may be implemented. The dongle device may comprise functionality and utilities (e.g., audio and/or video codecs, new/additional connection ports, etc.) for decoding 4K content (and other types of content). As a result, the dongle device may disable (or cause to be disabled) certain processing (e.g., decoding) on the STB, and may perform the disabled processing itself. In another instance, an STB may not comprise wireless communication. A dongle device may be implemented that comprises Wi-Fi and/or Bluetooth functionality. The STB may then use the dongle device to engage in wireless interactions.

In some aspects, processing functionality may be offloaded to the external module according to one or more criteria. For example, upon detecting a first connection between an appliance device and an external module, a setup/configuration operation may be invoked. The setup/configuration operation may include determining various details (e.g., hardware configuration, software configuration, technical capabilities, user preferences, etc.). Based at least in part on the determined details, the setup/configuration operation may facilitate the offloading of various processing functionality of the appliance device to the external module. The setup/configuration operation may additionally disable or remove the offloaded processing functionality from the appliance device. In other aspects, processing functionality may be preinstalled on the external module. For example, the external module may comprise the necessary hardware and software to perform a specific set of processing functionality. Upon detecting a connection between an appliance device and an external module, a setup/configuration operation may be invoked. The setup/configuration operation may disable a set of processing functionality on the appliance device and/or configure the appliance device to transmit content, events, and/or operations related to the offloaded processing functionality to the external module. In such an example, the setup/configuration operation may additionally reconfigure the appliance device to utilize or reallocate a set of resources, such as computing resource 202.

At operation 304, one or more events may be received and classified. In aspects, data (e.g., content, events, and/or operations) relating to functionality preinstalled on, or offloaded to, an external module may be received. In examples, the data may be received by the appliance device or by the external module via one or more external or internal input modalities. For example, a remote control paired to an appliance device may issue a command to stream ultra-high-definition (4K) content. The command may be received by an appliance device and/or received by an external module coupled to the appliance device. In aspects, the received events may be classified by the receiving device or module. Classifying the events may include parsing the event into one or more groups, identifying commands and operations corresponding to the events and groups, and/or associating the identified commands/operations with the groups. The receiving device (or a determination component associated therewith) may then determine whether the identified commands and operations are associated the processing functionality of the external module. As a specific example, the functionality to process new/emerging video resolutions (e.g., 4K, 8K, etc.) on STBs may be implemented in a dongle device comprising UI processing functionality. To enable the processing and rendering of content having such resolutions on an STB that is not configured to process such content, the dongle device may be connected to the STB. The dongle device may configure the STB to transmit notifications of UI-based events and/or event types received by the STB to the dongle device. For instance, the dongle device may configure and/or install one or more event handlers to handle UI-based events. Subsequently, the STB may generate or receive content and/or a a set of events. Upon detecting or receiving one or more events, the STB may parse the events into UI-based events and non-UI-based events. The STB may further parse the UI-based events into subcategories, such as demodulation events, descrambling events and decoding events. In at least one example, the subcategories may correspond to events to be processed by the STB (or a separate connected device) and events to be processed by the dongle device.

At operation 306, received events may be processed. In aspects, content and events received by an appliance device may be transmitted to and/or processed by one or more devices/modules comprising functionality for processing the events. For example, continuing the specific example above, the non-UI-based events or subcategory of UI-based events to be performed by the STB may be processed and/or performed by the STB. The STB may transmit the content and the UI-based events (or only the UI-based events to be processed by the dongle device) to the dongle device. The dongle device may then process the received UI-based events. Processing the UI-based events may include, for example, overlaying one or more UI elements (e.g., menus, windows, cursors, etc.) onto content, such as a base video stream made accessible by the STB. Alternately, processing the UI-based events may include decoding 4K content (and non-4K content) accessible to the STB. In aspects, the dongle device may provide the content and/or UI elements associated with the received events to a display device, such as display device 106. One of skill in the art will appreciate that, although specific reference has been made to UI functionality, other functionality of the appliance device or another computing device may alternately or additionally be preinstalled on, and/or offloaded to, an external module.

Figure 4:
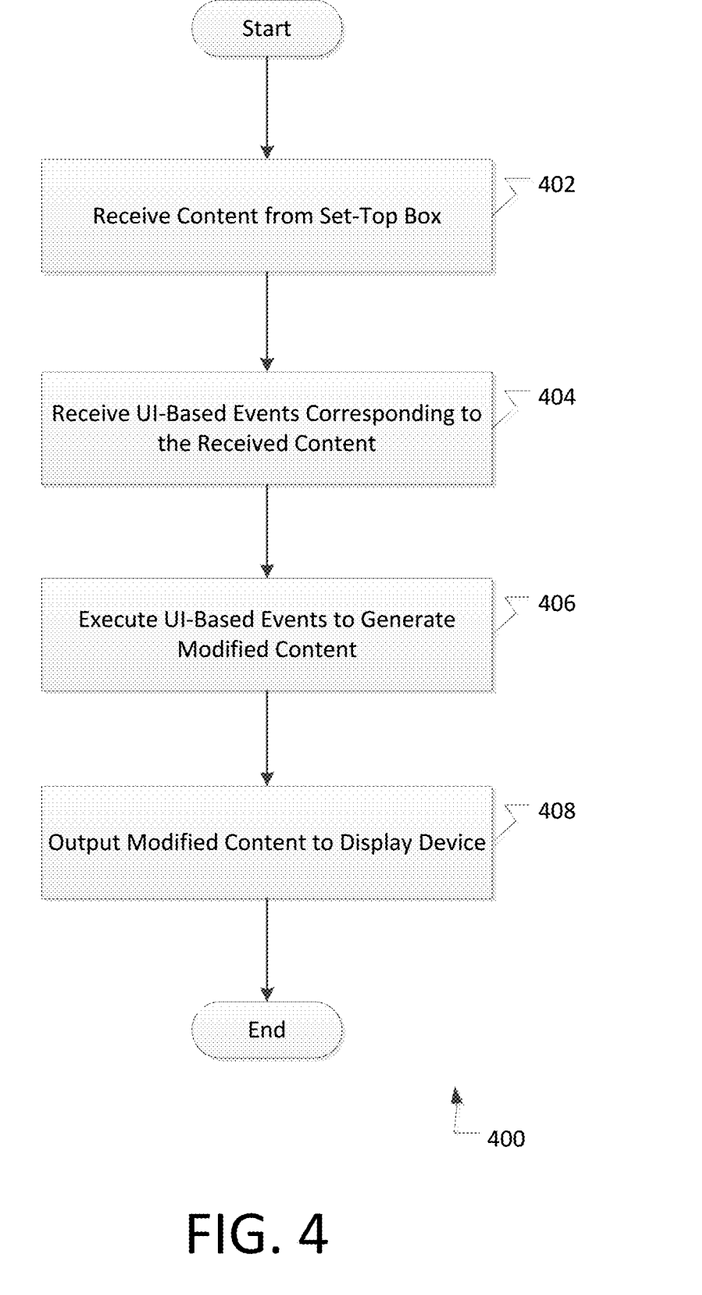
FIG. 4 illustrates an example method of processing offloaded functionality using a dongle device, as described herein.

FIG. 4 illustrates an example method of processing offloaded functionality using a dongle device, as described herein. Exemplary method 400 begins at operation 402 where a dongle device, such as external module 104, may receive content from a set-top box (STB), such as appliance device 102. In aspects, a dongle device may be connected to a STB and one or more display devices, such as display device 106. The STB may receive content from one or more content providers. The content may comprise, for example, one or more broadcasted data transmissions or data in one or more data stores. The STB may pass at least a portion of the received content to the dongle device.

At operation 404, UI-based events may be received. In aspects, the STB connected to the dongle device may receive a set of commands related to the received content. The set of commands may comprise numerous events for various functional subsystems of the STB, such as the UI subsystem, the timer subsystem, the content acquisition subsystem, etc. The STB may parse the received events into one or more categories. For example, the STB may create a category for UI-based events and a category for all other event types (e.g., non-UI-based events). The STB may locally process the events in the category comprising the non-UI-based events and pass the UI-based events to the dongle device.

At operation 406, UI-based events may be executed. In aspects, the dongle device may receive UI-based events corresponding to the content received from the STB. The dongle device may comprise hardware and software for processing and executing the received events. For example, the dongle device may comprise a processing unit and one or more code sets, such as code module 203. The code sets may enable the dongle device to process at least a portion of the UI functionality for the STB. In examples, the UT-based events received by the dongle device may correspond to the UI processing functionality provided by the dongle device. Upon receiving the UI-based events from the STB, the dongle device may process and/or validate the UI-based events. Processing the UI-based events may comprise determining whether the dongle device comprises the functionality required to execute the UI-based events, determining whether the dongle device is authorized to execute the functionality associated with the UI-based events, and/or recording the received UI-based events. In aspects, the received UI-based events (whether processed or unprocessed) may be executed by the dongle device. In examples, executing the UI-based events may generate new or additional content, select alternate content, select/generate one or more UI elements, or the like. Content and/or features generated or selected by executing the UI-based events may then be applied to content received from the STB to create modified content. For example, one or more UI elements (e.g., menus, windows, cursors, etc.) may be overlaid on the content received from the STB, a portion of the content received from the STB may be removed or occluded, the content received from the STB may be resized or reoriented, etc. Although specific reference has been made to UI-based events and functionality, one of skill in the art will appreciate that the teachings presented herein may be applied to other types of events and functionality.

At operation 408, modified content may be output to a display device. In aspects, content received and/or modified by the device dongle may be output to one or more devices connected to the device dongle. For example, the device dongle may be configured with multiple output ports/connections that enable the device dongle to be connected (in series or in parallel) to one or more display devices. In at least one aspect, the device dongle may output different content to display devices based on device type/capability or a set of preferences/configurations. For instance, the device dongle may output content in 4K to a television capable of rendering 4K content, and may output content in 1080p to a monitor capable of rendering 1080p content (but not capable of rendering 4K content).

Figure 5:
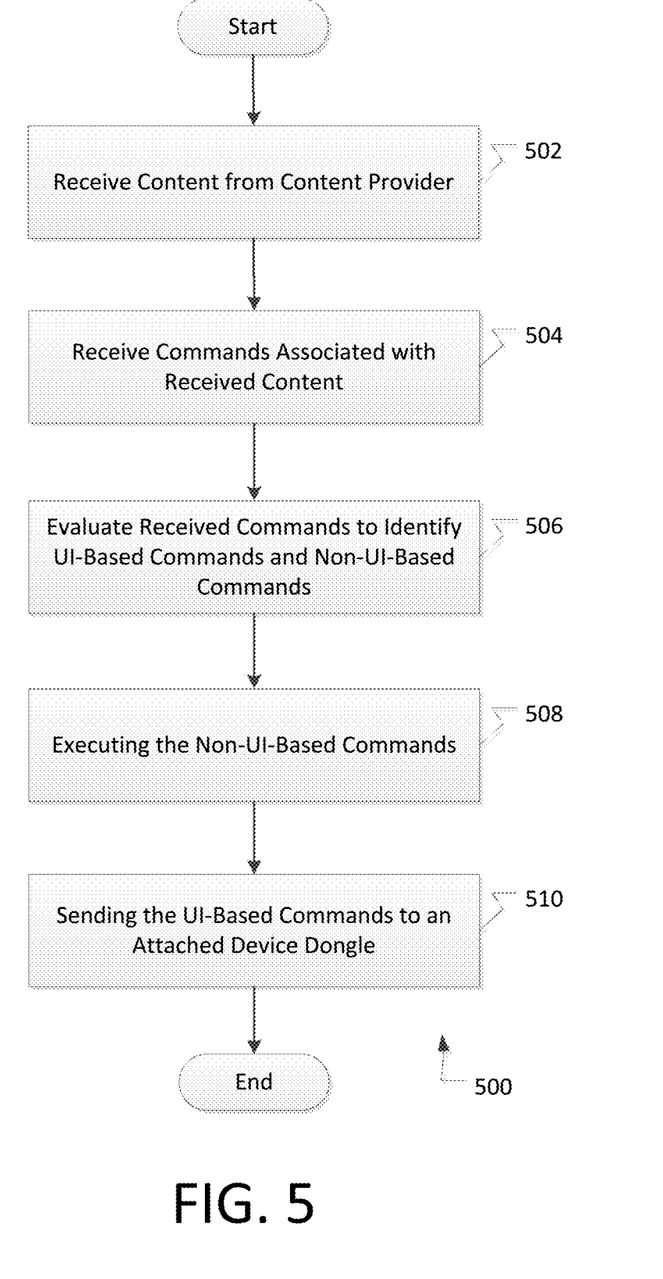
FIG. 5 illustrates an example method of segmenting and offloading commands to a dongle device, as described herein.

FIG. 5 illustrates an example method of segmenting and offloading commands to a dongle device, as described herein. Exemplary method 500 begins at operation 502 where a set-top box (STB), such as appliance device 102, may receive content. In aspects, an STB may be connected to a dongle device comprising functionality absent from the STB. For example, the STB may not be configured with necessary UI functionality to decode 4K content or with the necessary network functionality to enable wireless communications. To address these technological shortcomings of the STB, a dongle device may be connected to the STB. The dongle device may be configured with all (or a subset of) the UI code of the STB and may comprise one or more wireless components. The UI code may enable the dongle device to decode 4K content. In aspects, the STB may receive content from one or more content providers or content stores, or the STB may generate the content. The content may comprise, for example, one or more broadcasted data transmissions, data in one or more data stores, locally-generated, or the like.

At operation 504, a set of commands may be received. In aspects, the STB may receive a set of commands related to the received content. The set of commands may originate from an external or internal input modality, such as a remote control device, a keyboard, a microphone, etc. The set of commands may comprise, for example, trick mode commands (such as, play, forward, rewind, etc.), timer events, content acquisition requests (e.g., channel up, channel down, view DVR menu, etc.), electronic programming guide (EPG) navigation instructions, etc. In examples, the set of commands may be received as the content is displayed on a display device connected to the STB and/or the dongle device. The set of commands may be intended to interact with or modify the content.

At operation 506, the set of commands may be parsed into one or more groups. In aspects, the set of commands may comprise numerous events for various functional subsystems of the STB, such as the UI subsystem, the timer subsystem, the content acquisition subsystem, etc. The STB may parse the received events into one or more categories. For example, the STB may create a category for UI-based events and a category for all other event types (e.g., non-UI-based events). Additionally, the STB may create one or more subcategories for the UI-based events. For instance, the STB may divide the UI-based events into at least demodulation events, descrambling events and decoding events.

At operation 508, one or more groups of commands may be executed. In aspects, the various categories of commands created by the STB may correspond to the device(s) configured to process the events associated with the commands. For example, the non-UI-based event category may correspond to functionality of the STB and the UI-based event category may correspond to functionality of the dongle device. Accordingly, the STB may process and execute the non-UI-based events.

At operation 510, one or more groups of commands may be sent to the dongle device. In aspects, the events relating to functionality absent from the STB may be transmitted to the dongle device for processing. For example, as the STB lacks the functionality to perform at least some UI-based functionality, the corresponding UI events may be transmitted to the dongle device. The dongle device may then process and/or execute the received UI events. Although specific reference has been made to UI-based events and functionality, one of skill in the art will appreciate that the teachings presented herein may be applied to other types of events and functionality.

Figure 6:
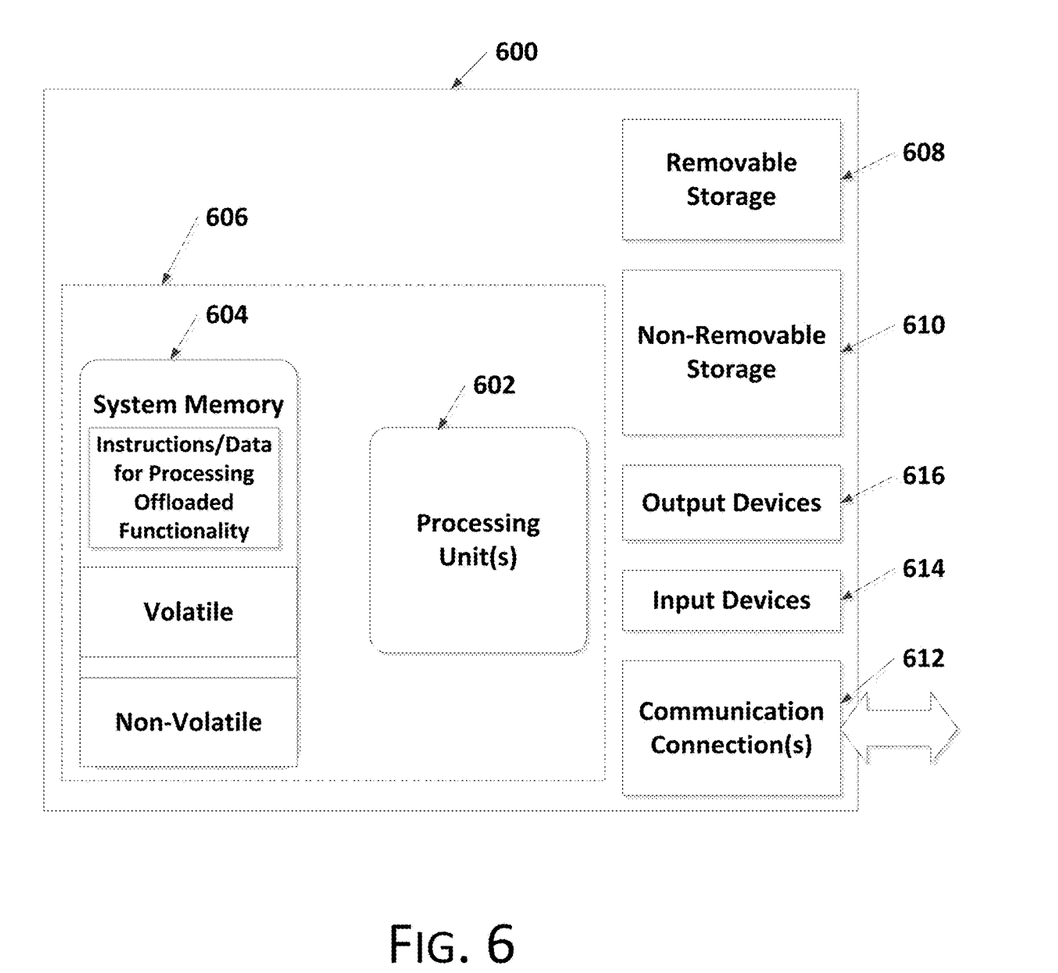
FIG. 6 illustrates one example of a suitable operating environment 400 in which one or more of the present embodiments may be implemented.

FIG. 6 illustrates one example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
  an appliance device comprising a first functionality and operative to receive content, wherein the content is associated with a set of commands related to the first functionality and a set of commands related to a second functionality different from the first functionality, wherein the appliance device is further operable to execute the set of commands related to the first functionality, and wherein the second functionality represents video decoding functionality unsupported by the appliance device; and
  an external dongle device comprising the second functionality and operative to receive the content and the set of commands related to the second functionality from the appliance device, wherein the external dongle device is selectively and externally connectable to the appliance device and to a display device, and wherein the external dongle device is further operable to execute the set of commands related to the second functionality to modify the content, and to transmit the modified content to the display device;
  wherein the external dongle device comprises user interface functionality related to the second functionality not supported by the appliance device, the user interface functionality being offloaded from the appliance device and comprising one or more functions relating to rendering an overlay of one or more user interface elements onto the content.

2. The system of claim 1, wherein the appliance device is a set-top box.

3. The system of claim 2, wherein the first functionality corresponds to non-user interface-based events and the second functionality corresponds to user interface-based events.

4. The system of claim 2, wherein the second functionality enables outputting the modified content using at least one of an HDMI interface and an HDCP interface.

5. The system of claim 1, wherein the appliance device receives a command set associated with the content, and separates the command set into the set of commands related to the first functionality and the set of commands related to the second functionality.

6. The system of claim 1, wherein the external dongle device is further operable to output the modified content to a plurality of devices.

7. The system of claim 1, wherein the external dongle device provides the appliance device access to at least one of wireless communications, processing resources and storage resources.

8. The system of claim 1, wherein, when the external dongle device is connected to the appliance device, a remote control previously not paired to the appliance device can be used to interact with the external dongle device.

9. The system of claim 1, wherein, when the external dongle device is connected to the appliance device, a remote control previously paired to the appliance device can be used to interact with the external dongle device.

10. The system of claim 1, wherein executing the set of commands related to the second functionality comprises at least one of: uncompressing the content, watermarking the content, transscrambling the content and transcoding the content.

11. The system of claim 1, wherein the appliance device previously comprised the second functionality, and wherein the second functionality was transferred from the appliance device to the external dongle device upon connecting the external dongle device to the appliance device.

12. A dongle device comprising:
  at least one processor; and
  memory coupled to the at least one processor, the memory comprising computer executable instructions that, when executed by the at least one processor, performs a method comprising:
    receiving content from a set-top box device connected to the dongle device;
    receiving a set of user interface-based events corresponding to the content, wherein the set of user interface-based events correspond to video decoding functionality not supported the set-top box, wherein the video decoding functionality is offloaded from the set-top box device and comprises one or more functions relating to rendering an overlay of one or more user interface elements onto the content;
    executing the set of user interface-based events to generate modified content; and outputting the modified content to a first display device connected to the dongle device.

13. The dongle device of claim 12, the dongle device further comprising one or more codecs for decoding 4K content.

14. The dongle device of claim 12, the dongle device further comprising a wireless component enabling the set-top box to transmit wireless communications.

15. The dongle device of claim 12, wherein the content has been demodulated and descrambled by the set-top box, and wherein executing the set of user interface-based events comprises decoding the demodulated and descrambled content.

16. The dongle device of claim 12, the method further comprising:
   identifying the first display device is connected to the dongle device and a second display device is connected to the dongle device; and
   outputting the modified content to the first display device and to the second display device.

17. A set-top box comprising:
   at least one processor; and
   memory coupled to the at least one processor, the memory comprising computer executable instructions that, when executed by the at least one processor, performs a method comprising:
     receiving content from a content provider;
     creating a first set of commands comprising user interface-based events and a second set of commands different from the first set of commands, the second set of commands comprising non-user interface based-events, wherein the second set of user commands correspond to video decoding functionality not supported by the set-top box;
     executing, by the set-top box, the first set of commands; and
     sending the second set of commands to a dongle device connected to the set-top box, wherein the dongle device comprises user interface functionality off-loaded from the set-top box, wherein the user interface functionality comprises one or more functions relating to rendering an overlay of one or more user interface elements onto the content.

18. The set-top box of claim 17, wherein the first set of commands corresponds to functionality enabled on the set-top box and the second set of commands corresponds to functionality enabled on the dongle device.

19. The set-top box of claim 17, wherein computing resources previously allocated by the set-top box to process events related to the second set of commands are freed when the set-top box is connected to the dongle device.

20. The system of claim 1, wherein the of one or more user interface elements comprise at least one of:
   a menu;
   a window; or
   a cursor.

* * * * *